United States Patent
Afroz et al.

(10) Patent No.: US 11,711,372 B2
(45) Date of Patent: Jul. 25, 2023

(54) NETWORK RESOURCE PRIVACY NEGOTIATION SYSTEM AND METHOD

(71) Applicant: Avast Software s.r.o., Prague (CZ)

(72) Inventors: Sadia Afroz, Berkeley, CA (US); Juyong Do, Cupertino, CA (US); John Poothokaran, Palo Alto, CA (US)

(73) Assignee: Avast Software s.r.o., Prague (CZ)

( * ) Notice: Subject to any disclaimer, the term of this patent is extended or adjusted under 35 U.S.C. 154(b) by 505 days.

(21) Appl. No.: 16/820,005

(22) Filed: Mar. 16, 2020

(65) Prior Publication Data

US 2021/0288965 A1 Sep. 16, 2021

(51) Int. Cl.
| | |
|---|---|
| *H04L 29/06* | (2006.01) |
| *H04L 9/40* | (2022.01) |
| *G06F 21/62* | (2013.01) |
| *G06F 16/9535* | (2019.01) |

(52) U.S. Cl.
CPC ........ *H04L 63/102* (2013.01); *G06F 16/9535* (2019.01); *G06F 21/6263* (2013.01)

(58) Field of Classification Search
None
See application file for complete search history.

(56) References Cited

U.S. PATENT DOCUMENTS

| | | | |
|---|---|---|---|
| 10,097,583 B1 * | 10/2018 | Demirjian | H04L 63/08 |
| 10,402,585 B2 * | 9/2019 | Hu | H04L 63/20 |
| 10,552,637 B1 * | 2/2020 | Phillips | G06F 16/90335 |
| 2014/0222974 A1 * | 8/2014 | Liu | H04W 80/12 |
| | | | 709/219 |
| 2019/0116142 A1 * | 4/2019 | Chalakudi | H04L 67/104 |
| 2020/0042837 A1 * | 2/2020 | Skinner | G06F 18/217 |

OTHER PUBLICATIONS

Website Screen capture mygaru.com, Jan. 21, 2020.

* cited by examiner

*Primary Examiner* — Sanchit K Sarker
(74) *Attorney, Agent, or Firm* — Dovas Law, P.C.

(57) ABSTRACT

A method for accessing a network resource including detecting an attempt by a user via a computing device to access a service enabled by a computing system via a network and transmitting via the network to the computing system a first request to access the service in response to detecting the attempt by the user to access the service, the first request including at least one empty personally identifiable data structure. A failure to access the service responsive to the first request is determined. A second request to access the service in response to the first failure to access the service is transmitted via the network to the computing system, the second request including artificial personally identifiable information, and access to the service from the computing system is received for the user.

13 Claims, 13 Drawing Sheets

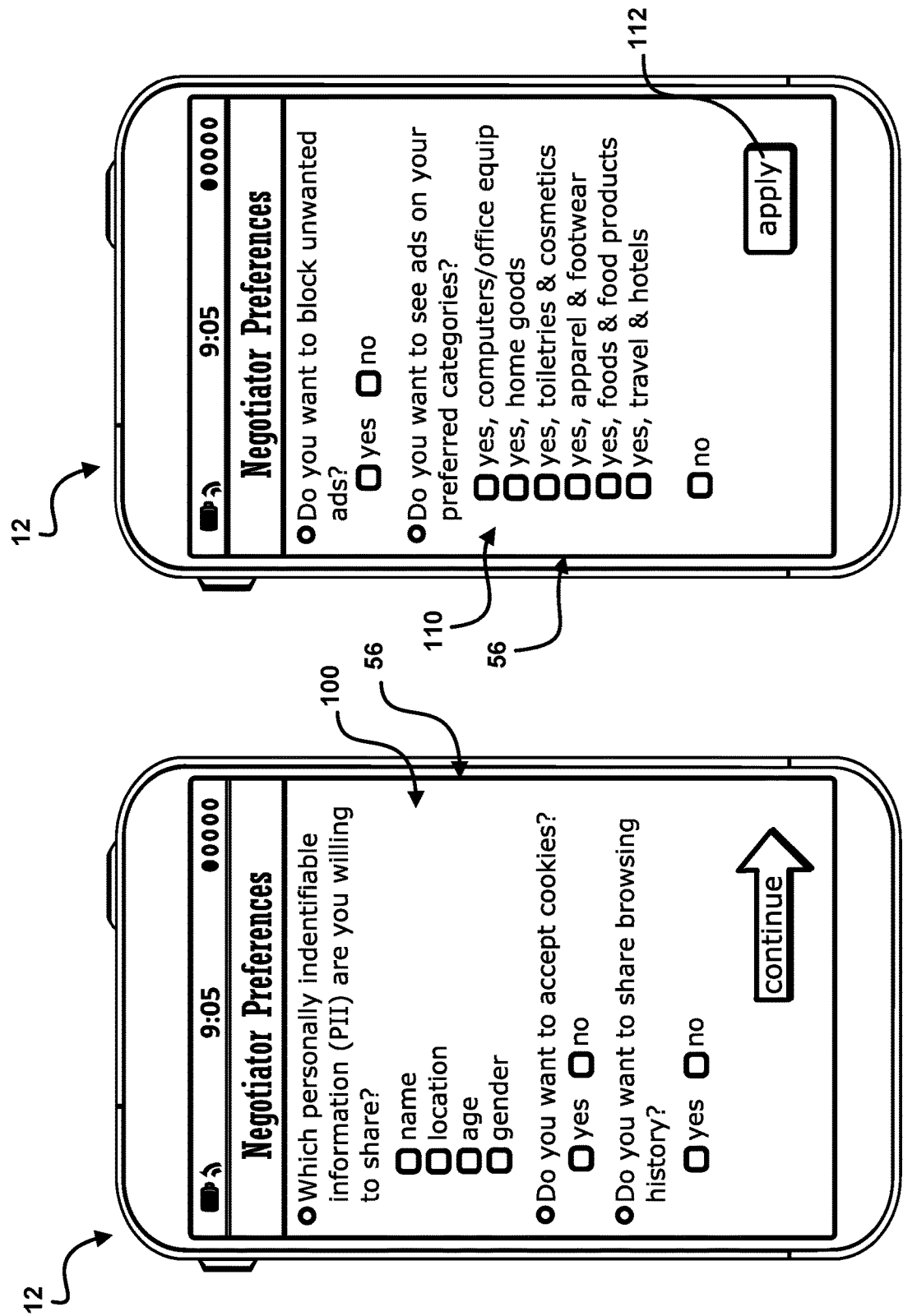

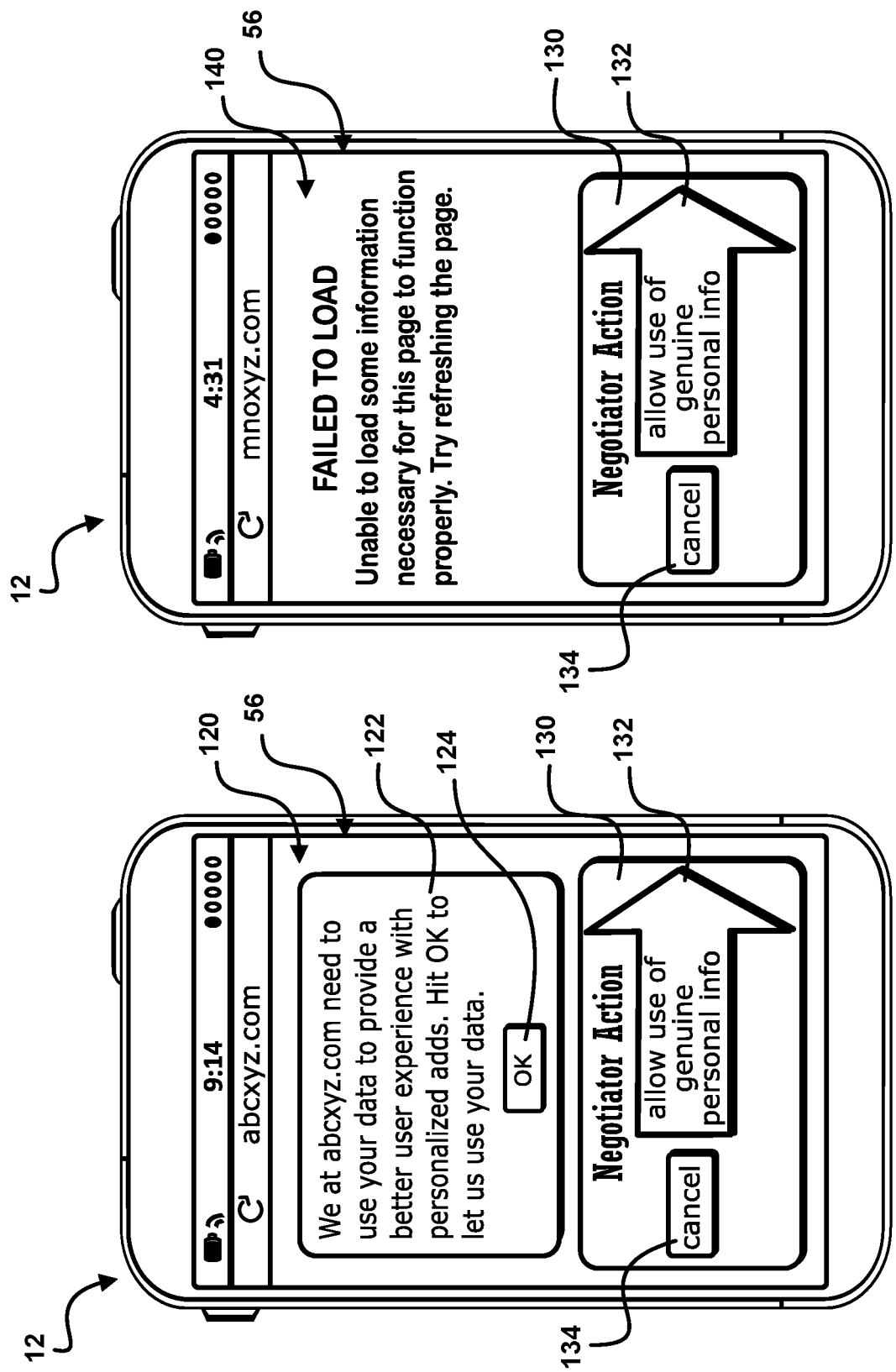

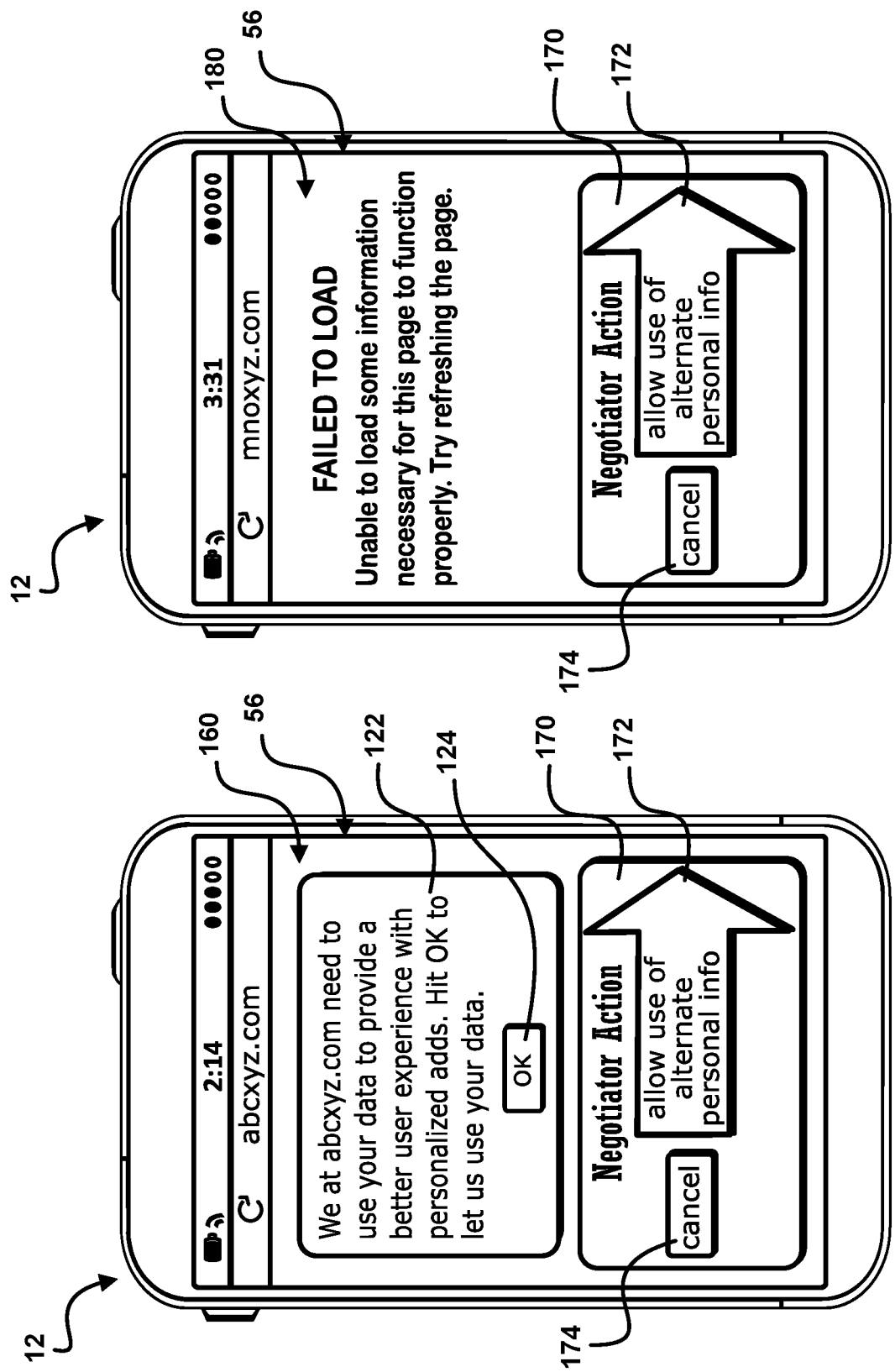

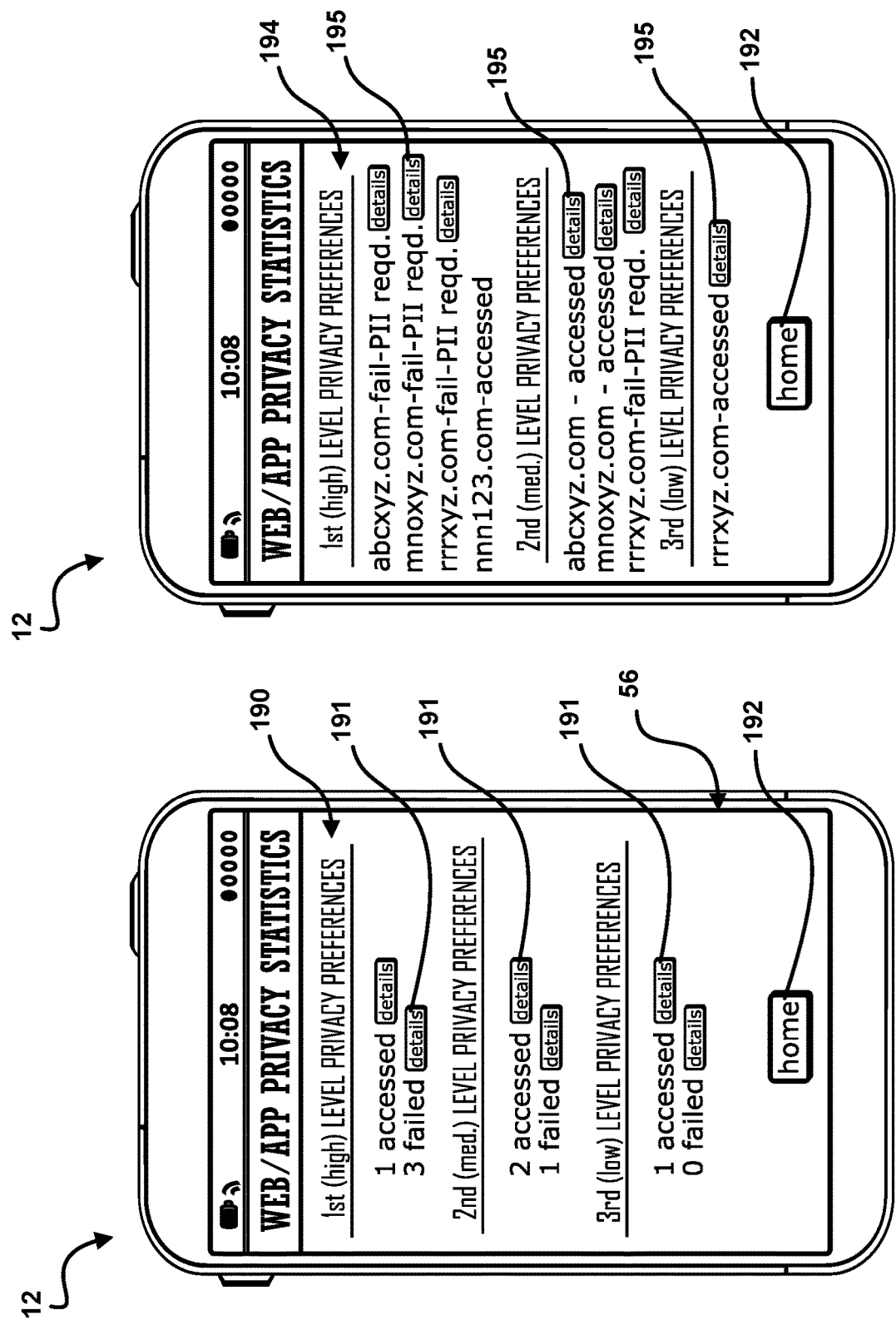

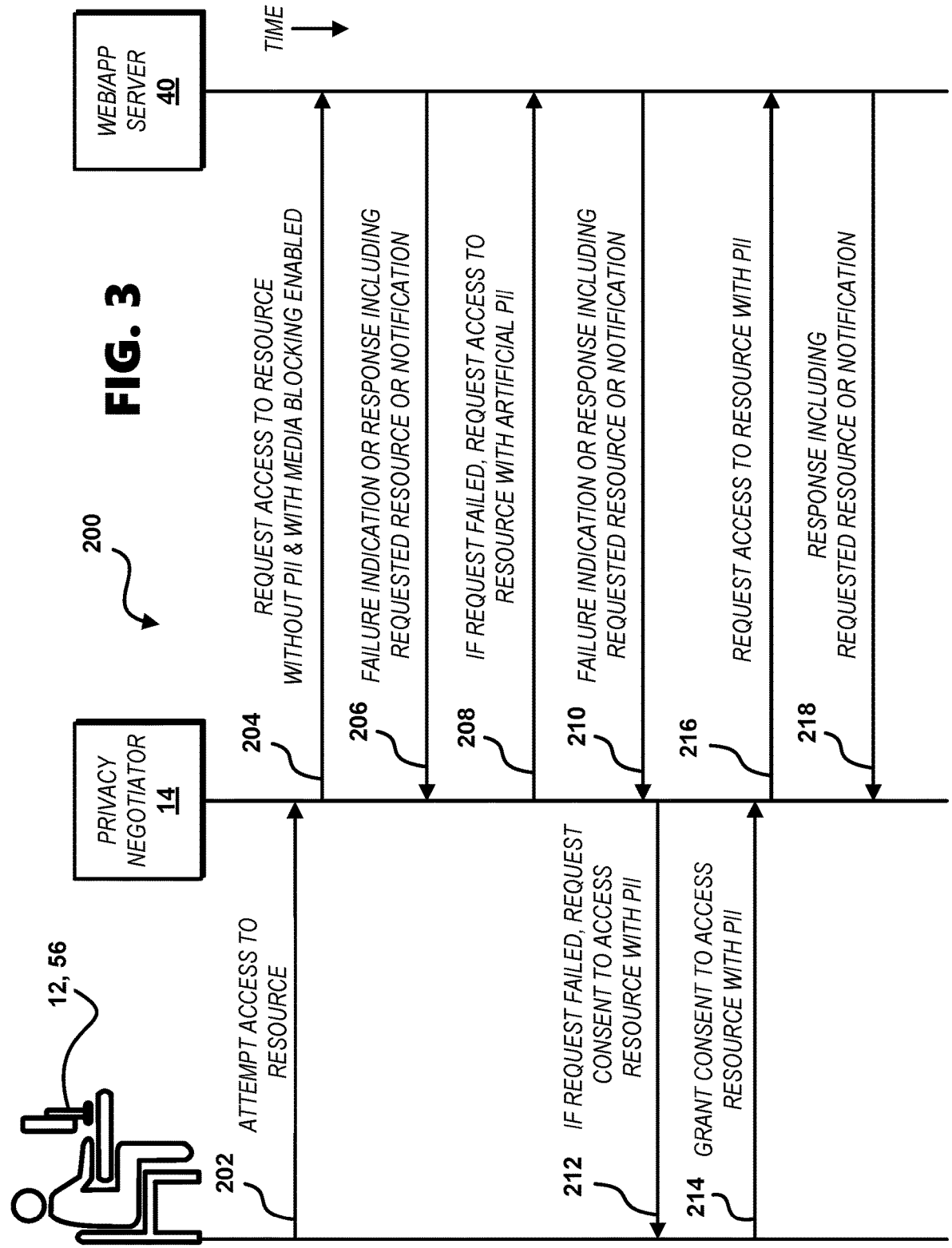

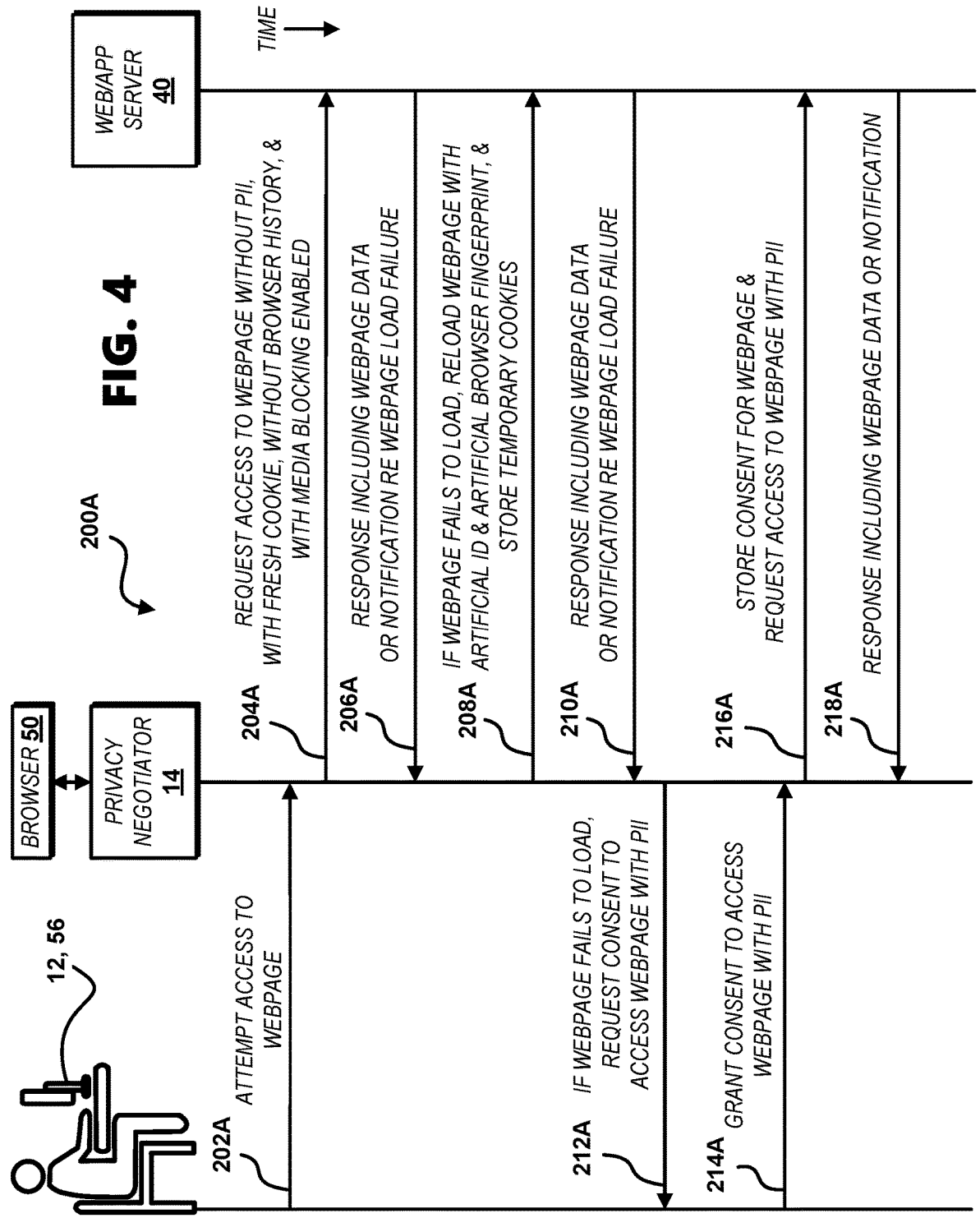

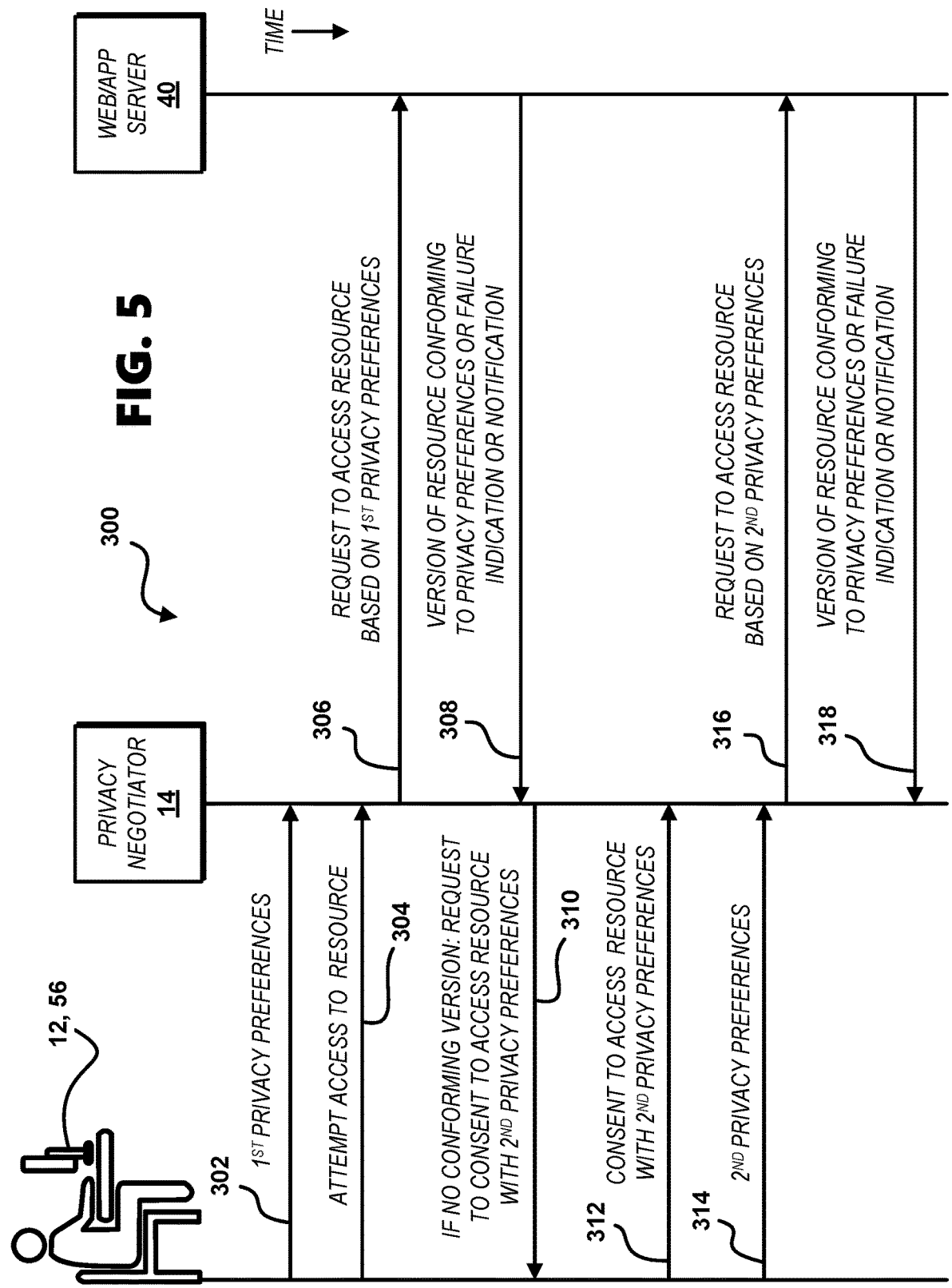

NETWORK RESOURCE PRIVACY NEGOTIATION SYSTEM AND METHOD

FIELD OF INVENTION

The invention relates generally to data privacy, and more particularly to website and computer application data privacy.

BACKGROUND

Privacy settings for websites and other online services are typically set by the providers of the websites and other online services. Additional privacy settings may be set through a user's web browser, for example Chrome™, Internet Explorer™, Edge™, Firefox™, and Opera™ browsers. Users have many options to select from in instituting privacy settings, and the consequences of their selected options are not always apparent. Often webpages or other online services do not load or do not function as expected if a user does not accept the privacy terms of the provider of the webpage or other online services.

SUMMARY

This Summary introduces simplified concepts that are further described below in the Detailed Description of Illustrative Embodiments. This Summary is not intended to identify key features or essential features of the claimed subject matter and is not intended to be used to limit the scope of the claimed subject matter.

A method for accessing a network resource is provided. The method includes detecting an attempt by a user via a computing device to access a service enabled by a computing system via a network and transmitting via the network to the computing system a first request to access the service in response to detecting the attempt by the user to access the service, the first request including at least one empty personally identifiable data structure. A failure to access the service responsive to the first request is determined. A second request to access the service in response to the first failure to access the service is transmitted via the network to the computing system, the second request including artificial personally identifiable information, and access to the service from the computing system is received for the user.

Further provided is another method for accessing a network resource, the method including receiving first privacy preference parameters of a user, detecting an attempt by the user via a computing device to access a service enabled by a computing system via a network, and transmitting via the network to the computing system a first request to access the service using the first privacy preference parameters of the user in response to detecting the attempt by the user to access the service. A failure to access the service is determined, the failure to access the service responsive to the first request. The user is queried for consent to access the service using second privacy preference parameters, the consent to access the service using the second privacy preference parameters is received from the user, and the second privacy preference parameters of the user are received. A second request to access the service is transmitted via the network to the computing system using the second privacy preference parameters in response to receiving from the user the consent to access the service using the second privacy preference parameters, and access to the service from the computing system is received for the user.

An electronic system is provided including a computing device including one or more hardware processors and one or more non-transitory computer-readable storage mediums coupled to the one or more hardware processors and storing programming instructions for execution by the one or more hardware processors, wherein the programming instructions, when executed, cause the computing device to perform operations including detecting an attempt by a user via the computing device to access a service enabled by a computing system via a network, and transmitting via the network to the computing system a first request to access the service in response to detecting the attempt by the user to access the service, the first request including one or more empty personally identifiable data structures. The operations further include determining a first failure to access the service, the first failure to access the service responsive to the first request, transmitting via the network to the computing system a second request to access the service in response to the first failure to access the service, the second request including artificial personally identifiable information, and receiving access to the service for the user. The operations can further include determining a second failure to access the service via the second request including the artificial personally identifiable information, querying the user via the computing device for consent to access the service using genuine personally identifiable information of the user, receiving from the user via the computing device the consent to access the service using the genuine personally identifiable information of the user, transmitting via the network to the computing system a third request to access the service in response to receiving from the user the consent, the third request including the genuine personally identifiable information of the user, and receiving the access to the service after transmitting the third request via the network to the computing system.

Further provided is a method for accessing a webpage, the method including detecting an attempt by a user via a computing device to access a webpage enabled by a computing system via a network, and transmitting via the network to the computing system a first request to access the webpage using artificial privacy preference parameters in response to detecting the attempt by the user to access the webpage. A failure to access the webpage is determined, the failure to access the webpage responsive to the first request. The user is queried for consent to access the webpage using genuine privacy preference parameters of the user, and the consent to access the webpage using the genuine privacy preference parameters of the user is received from the user. A second request to access the webpage using the genuine privacy preference parameters of the user is transmitted via the network to the computing system in response to receiving from the user the consent to access the webpage using the genuine privacy preference parameters of the user, and access to the webpage is received from the computing system for the user.

BRIEF DESCRIPTION OF THE DRAWING(S)

A more detailed understanding may be had from the following description, given by way of example with the accompanying drawings. The Figures in the drawings and the detailed description are examples. The Figures and the detailed description are not to be considered limiting and other examples are possible. Like reference numerals in the Figures indicate like elements wherein:

FIGS. 2A-2I show example interactive displays for engaging a user for instituting network privacy negotiations.

FIGS. 3-6 show illustrative communication flows between a privacy negotiator, a user interface, and a network-accessible server.

DETAILED DESCRIPTION OF ILLUSTRATIVE EMBODIMENT(S)

Figure 1:
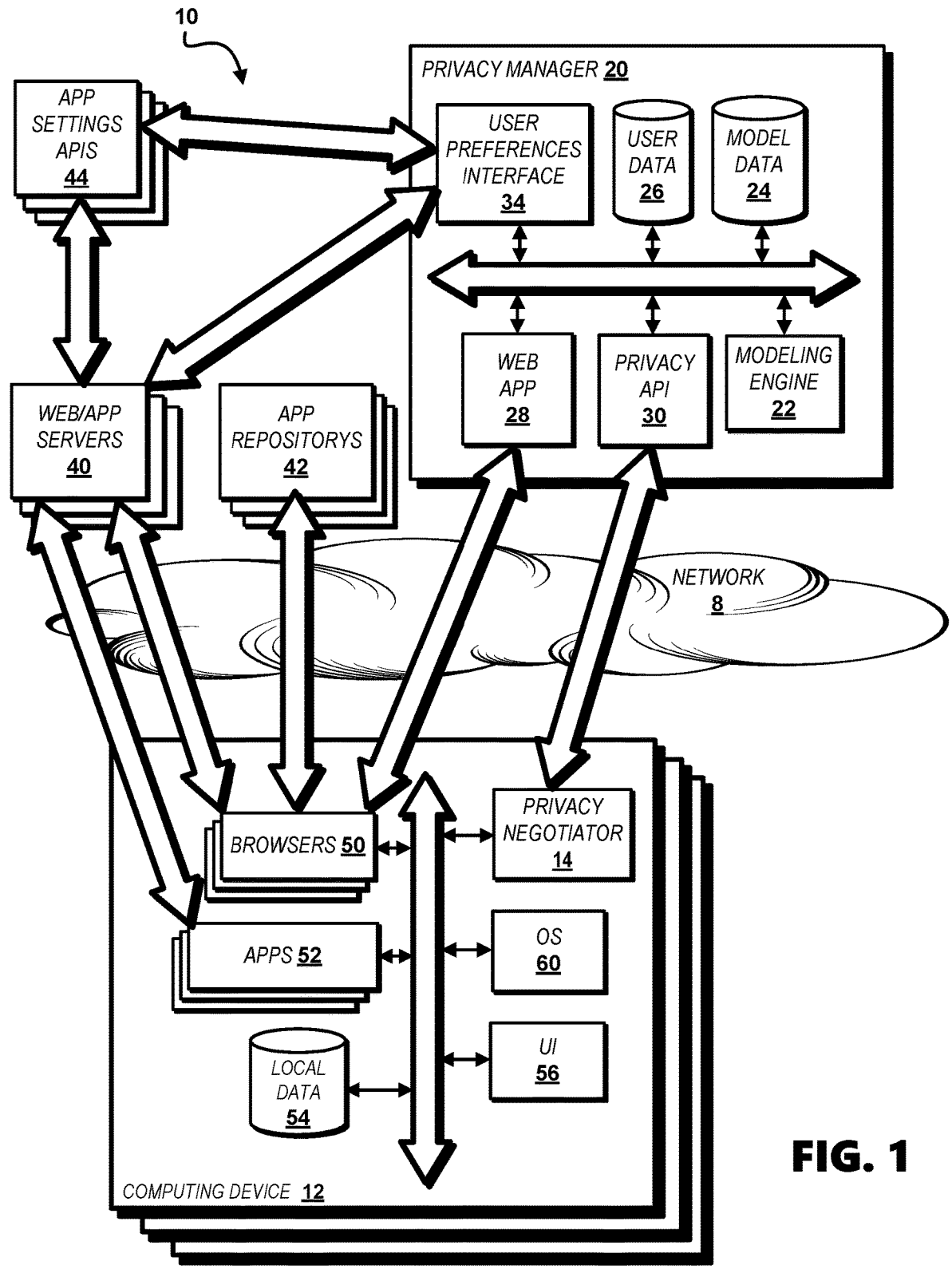
FIG. 1 shows a system for performing privacy negotiation and enabling user access to network resources.
Figure 21:
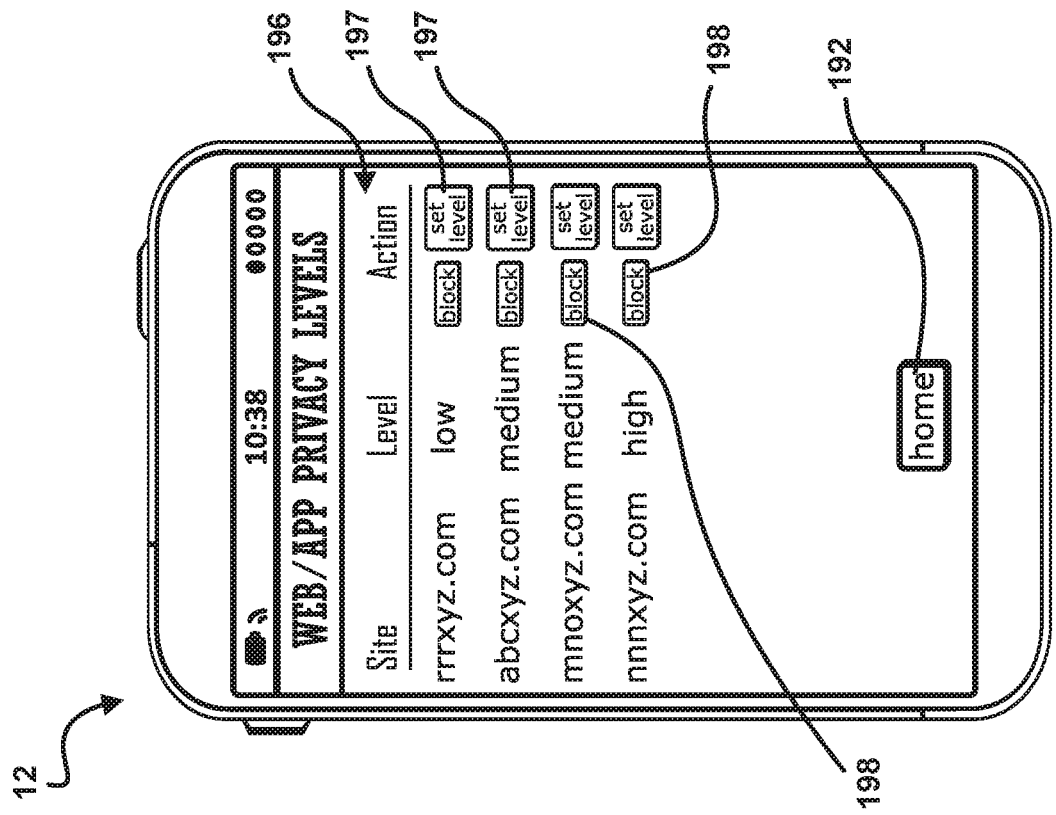

Referring to FIG. 1, a system 10 for performing privacy negotiation and enabling user access to network resources is provided. The system 10 is provided in a communications network 8 including one or more wired or wireless networks or a combination thereof, for example including a local area network (LAN), a wide area network (WAN), the Internet, mobile telephone networks, and wireless data networks such as Wi-Fi™ and 3G/4G/5G cellular networks. Operating system 60 (hereinafter "OS 60") is executed on computing devices 12. The system 10 enables privacy negotiation to enable user access to services including websites, webpages of websites, and applications. Further, the system 10 enables the providing of a computing environment for a user to manage the user's electronic privacy preferences. The system 10 provides an automated, intuitive, and personalized way for a user to negotiate acceptable privacy settings based on a user's privacy preferences and requiring minimal user input.

A network-connectable processor-enabled privacy manager 20 enables survey queries to be provided to a user of a computing device 12. The queries can be provided in a user interface 56 via instructions from a privacy negotiator 14 based on data transmitted from a privacy application program interface ("API") 30 of the privacy manager 20. Alternatively, queries can be provided via the user interface 56 based on data transmitted from a web application 28 enabled by the privacy manager 20 and accessible via a web browser 50 executed on the computing device 12. A user's responses to the survey queries can reflect the importance to the user of topics including data sharing permissions, data collection permissions, or website or application data requirements, which information is stored in a user datastore 26 or a local datastore 54 and used by the privacy manager 20 or the privacy negotiator 14 in performing privacy negotiations with network-accessible computing systems hosting websites, webpages of websites, and applications. Websites and applications can include for example social media or messaging applications or platforms for example Facebook™, LinkedIn™, and Google™ social media or messaging applications or platforms. Applications can include standalone applications, plugins, add-ons, or extensions to existing applications, for example web browser plugins. Applications or components thereof can be installed and executed locally on a computing device 12 or installed and executed on remote computing systems accessible to the computing device 12 via a communications network 8, for example the Internet.

A website server or application server 40 (hereinafter "web/app server") can function to enable local applications 52 or components of a local application 52. Web/app servers 40 can further enable services including network-based applications, webpages, or other services accessible via a web browser 50. Local applications 52 can be downloaded for example via a web browser 50 from an application repository 42. The privacy negotiator 14 monitors user activity on the computing device 12 including a user's use of local and network-based applications, accessing of websites, explicit and implicit acceptance of application and website data privacy policies. Statistics of such use is used by the modeling engine 22 to build data-driven statistical models of user privacy preference stored in the model datastore 24 of the privacy manager 20 or the local datastore 54 of the computing device 12. The modeling engine 22 can for example function under the assumption that a user would consent to terms of a data privacy policy if that user had already consented to similar terms of another data privacy policy in the past.

To enable negotiation processes performed via the privacy negotiator 14 and the privacy manager 20, a user of a computing device 12 is beneficially queried by the privacy negotiator 14 via the user interface 56. The user can be provided a number of questions (e.g., 5-10 questions) regarding their privacy preferences. The questions relate to what the user is willing to accept from and share with a website, application, or other network-based service. For example a user can be asked if they are willing to share their browsing histories, browser fingerprints, dynamic or static location, demographic information, and advertising preferences and the user's responses can be stored by the privacy negotiator 14 in a local datastore 54 or the user datastore 26. The user indicates to the privacy negotiator 14 a service, for example a website, they want to access. In the case that the service includes a hosted webpage, and the privacy negotiator 14 functions as an add-on or plugin to a web browser 50 which monitors activity of the web browser 50, the user can enter the Universal Resource Locator ("URL") or portion thereof of the hosted webpage into the web browser 50.

Responsive to a user's attempt to access a webpage, website or other service, the privacy negotiator 14 enables a request to the web/app server 40 hosting the webpage, website or other service based on the user's privacy preferences. If allowed by the web/app server 40, the privacy negotiator 14, for example via the browser 50, loads a version of the webpage or website or other service including a network resource which conforms with the user's privacy preferences as accepted by the web/app server 40. A user's privacy preferences can be rendered available to the web/app server 40 responsive to a user's attempt to access the webpage via the web browser 50. Alternatively, the user's privacy preferences can be communicated to web/app servers 40 by a user preferences interface 34 of the privacy manager 20, either directly or via application settings APIs 44 of the web/app servers 40 and stored by the web/app servers 40 for future communication with the user via the web browser 50. If a particular request enabled by the privacy negotiator 14 fails to result in loading of webpage or website or other service, one or more additional requests are enabled with alternate or less stringent privacy preferences for example allowing greater access to a user's personally identifiable information ("PII") or artificial PII generated by the privacy negotiator 14. By enabling requests as such with different levels of privacy preferences, a user is able to minimize PII available to a particular webpage or website or other service the user seeks to access.

The privacy negotiator 14, or alternatively the modeling engine 22, further automatically translates and updates the user's privacy preferences to adapt to the protocols of specific websites or other hosted services, as different websites or other hosted services may use different language and formats for describing and selecting privacy preferences. Different websites or other services providing network resources can have different responses to user requests. Many websites or other services may not accept a user's privacy preferences causing failure to load webpages or other network resources.

Successful requests by the privacy negotiator 14 to access a particular webpage, website or other service and corresponding privacy preferences are stored and reused the next time the user attempts to access the particular webpage, website or other service. This minimizes the number of requests to access transmitted by the privacy negotiator 14. Successful requests and corresponding privacy preferences are stored in a persistent memory attached to the privacy negotiator 14 or stored in the user datastore 26 of the privacy manager 20. Successful requests and corresponding privacy preferences stored in the user datastore 26 of the privacy manager 20 can further be used by other users attempting to access the particular webpage, website or other service on their own computing devices 12 via a privacy negotiator 14 in communication with the privacy manager 20.

Referring to FIGS. 2A and 2B, first and second exemplary interactive displays 100, 110 show queries generated by the privacy negotiator 14 via the user interface 56 of the computing device 12 during use by a user of a web browser 50. The first exemplary display 100 queries "Which personally identifiable information (PII) are you willing to share?" and provides corresponding user-selectable responses including "name," "location," "age," and "gender". The first exemplary display 100 further queries "Do you want to accept cookies?" and "Do you want to share browsing history?" and provides corresponding user-selectable responses including "yes" and "no". A second exemplary interactive display 110 queries "Do you want to block unwanted ads?" and provides corresponding user-selectable responses including "yes" and "no". The second exemplary interactive display 110 further queries "Do you want to see ads on your preferred categories?" and provides corresponding user-selectable responses including "yes, computers/office equip," "yes, home goods," "yes, toiletries & cosmetics," "yes, apparel & footwear" "yes, foods & food products," "yes, travel & hotels," and "no." By actuation of an "apply" button 112, a user's responses to queries of the first and second exemplary interactive displays 100, 110 are stored in one or both of the local datastore 54 and the user datastore 26 for use by the privacy negotiator 14 in negotiating privacy settings for network resources, for example applications, webpages, or other services enabled by web/app servers 40.

Referring to FIGS. 2C and 2D, third and fourth exemplary interactive displays 120, 140 show actions by the privacy negotiator 14 via the user interface 56 of the computing device 12 during use by a user of a web browser 50. The third exemplary interactive display 120 shows a pop-up notice 122 transmitted by a web/app server 40 and enabled by the web browser 50. Data enabling the pop-up notice 122 is received responsive to a request by the privacy negotiator 14 to the web/app server 40 to access, without particular personally identifiable information or with artificial personally identifiable information, webpage data corresponding to the uniform resource locator ("URL") "abcxyz.com". The pop-up notice 122 reads "We at abcxyz.com need to use your data to provide a better user experience with personalized ads. Hit OK to let us use your data." The pop-up notice 122 includes an "OK" button 124 to permit use of user's data by the web/app server 40 via the web browser 50. The pop-up notice 122 suggests that the absence of the particular personally identifiable information, the use of the artificial personally identifiable information, or the browser privacy settings (e.g., an ad blocking setting, a cookies setting, a "do not track" setting) instituted by the privacy negotiator 14 may preclude receipt of webpage data of abcxyz.com from the web/app server 40 sufficient to allow proper loading of a particular webpage by the web browser 50. In another example, a request by the privacy negotiator 14 to a web/app server 40 to access webpage data corresponding to the URL "mnoxyz.com" without particular personally identifiable information or with artificial personally identifiable information results in failure. The fourth exemplary interactive display 140 provides a failure notice generated by the web browser 50 and displayed via the user interface 56 which reads "FAILED TO LOAD" and "Unable to load some information necessary for this page to function properly. Try refreshing the page." The notice generated in the fourth exemplary interactive display 140 suggests that the absence of the particular personally identifiable information, the use of the artificial personally identifiable information, or the browser privacy settings (e.g., an ad blocking setting, a cookies setting, a "do not track" setting) instituted by the privacy negotiator 14 may preclude receipt of webpage data of mnoxyz.com from the web/app server 40 necessary to properly load a particular webpage by the web browser 50.

In response to the failure to load the particular webpage corresponding to abcxyz.com suggested by the pop-up notice 122 of the third exemplary interactive display 120, or in response to the failure to load the particular webpage corresponding to mnoxyz.com suggested by the notice in the fourth exemplary interactive display 140, the privacy negotiator 14 generates and displays a query via the user interface 56 in the form of an action window 130. The action window 130 allows a user to reload the particular webpage corresponding to "abcxyz.com" or "mnoxyz.com" using genuine personally identifiable information by actuating an "allow use of genuine personal info" button 132. Actuation of the "allow use of genuine personal info" button 132 beneficially also sets browser privacy settings (e.g., an ad blocking setting, a cookies setting, a "do not track" setting) to less private levels, for example not implementing ad blocking, allowing all cookies, and allowing tracking. The action window 130 further allows the user to discontinue their attempt to access the particular webpage by actuating a cancel button 134 which results in the privacy negotiator 14 taking no further action to access abcxyz.com or mnoxyz.com. It would be apparent to one skilled in the art that the action window 130 could function with respect to any URL accessible via a browser.

Referring to FIGS. 2E and 2F, fifth and sixth exemplary interactive displays 160, 180 show alternative actions by the privacy negotiator 14 via the user interface 56 of the computing device 12 during use by a user of a web browser 50. The fifth exemplary interactive display 160 shows the pop-up notice 122 transmitted by the web/app server 40 and enabled by the web browser 50. Data enabling the pop-up notice 122 is received responsive to a request by the privacy negotiator 14 to the web/app server 40 to access, with first personally identifiable information of a user, webpage data corresponding to the uniform resource locator ("URL") "abcxyz.com." As indicated above, the pop-up notice 122 reads "We at abcxyz.com need to use your data to provide a better user experience with personalized ads. Hit OK to let us use your data." The pop-up notice 122 includes an "OK" button 124 to permit use of the user's data by the web/app server 40 via the web browser 50. The pop-up notice 122 suggests that the first personally identifiable information or the browser privacy settings (e.g., an ad blocking setting, a cookies setting, a "do not track" setting) instituted by the privacy negotiator 14 is inadequate to allow receipt of webpage data of abcxyz.com from the web/app server 40 sufficient to allow proper loading of a particular webpage by the web browser 50. In another example, a request by the privacy negotiator 14 to a web/app server 40 to access, with first personally identifiable information, webpage data corresponding to the URL "mnoxyz.com" results in failure. The sixth exemplary interactive display 180 provides a failure notice generated by the web browser 50 and displayed via the user interface 56 which reads "FAILED TO LOAD" and "Unable to load some information necessary for this page to function properly. Try refreshing the page." The notice generated in the sixth exemplary interactive display 180 suggests that the first personally identifiable information or the browser privacy settings (e.g., an ad blocking setting, a cookies setting, a "do not track" setting) instituted by the privacy negotiator 14 may be inadequate to allow receipt of webpage data of mnoxyz.com from the web/app server 40 necessary to properly load a particular webpage by the web browser 50.

In response to the failure to load the particular webpage corresponding to abcxyz.com suggested by the pop-up notice 122 of the fifth exemplary interactive display 160, and in response to the failure to load the particular webpage corresponding to mnoxyz.com suggested by the notice in the sixth exemplary interactive display 180, the privacy negotiator 14 generates and displays a query via the user interface 56 in the form of an action window 170. The action window 170 allows a user to reload the particular webpage corresponding to "abcxyz.com" or "mnoxyz.com" using second ("alternate") personally identifiable information by actuating an "allow use of alternate personal info" button 172. Actuation of the "allow use of alternate personal info" button 172 beneficially also sets browser privacy settings (e.g., an ad blocking setting, a cookies setting, a "do not track" setting) to less private levels, for example not implementing ad blocking, allowing all cookies, and allowing tracking. The action window 170 further allows the user to discontinue their attempt to access the particular webpage by actuating a cancel button 174 which results in the privacy negotiator 14 taking no further action to access abcxyz.com or mnoxyz.com. It would be apparent to one skilled in the art that the action window 170 could function with respect to any URL accessible via a browser.

Users are beneficially provided via the privacy negotiator 14 with statistics of successes and failures of privacy negotiations performed by the privacy negotiator 14. The statistics can include a number of webpages, websites or other services accessed based on a first privacy preference level of a first access request, a second privacy preference level of a second access request, or additional privacy preference levels of additional access requests. A particular privacy preference level corresponds for example to different amounts of PII, no PII, or artificial PII. The statistics beneficially further include indications of failures of access requests at the different privacy preference levels and reasons for the failures. An indicated reason for failure can include for example that particular PII requested by a system hosting a webpage or website or other service was not rendered accessible to such system resulting in an access failure.

Referring to FIG. 2G, a seventh exemplary interactive display 190 shows via the user interface 56 "web/app privacy statistics" generated by the privacy negotiator 14. The seventh exemplary interactive display 190 indicates that one service was accessed using first level privacy preferences, two services were accessed using second level privacy preferences, and one service was accessed using third level privacy preferences, the privacy preferences being less restrictive (e.g., releasing more PII to the services) with each level increase. The seventh exemplary interactive display 190 further indicates that three services were failed to be accessed using the first level privacy preferences, one service was failed to be accessed using the second level privacy preferences, and no service was failed to be accessed using the third level privacy preferences. A plurality of "details" buttons 191 are provided for actuation by a user to provide further details regarding accessed services and failed to be accessed services including reasons for the failures, for example reasons indicating that particular PII requested by systems hosting webpages or websites or other services was not rendered accessible to such systems resulting in access failures. A "home" button 192 is provided to direct the user to a home screen enabled by the privacy negotiator 14.

Referring to FIG. 2H, an eighth exemplary interactive display 194 shows via the user interface 56 alternative "web/app privacy statistics" generated by the privacy negotiator 14 in which particular websites which were accessed or failed to be accessed are listed with the level of privacy preference corresponding to such access or failure to access. The eight exemplary interactive display 194 indicates that "nnn123.com" was accessed using first level privacy preferences, "abcxyz.com" and "mnoxyz.com" were accessed using second level privacy preferences, and "rrrxyz.com" was accessed using third level privacy preferences, the privacy preferences being less restrictive (e.g., releasing more PII to the websites) with each level increase. The eighth exemplary interactive display 194 further indicates that "abcxyz.com," "mnoxyz.com," and "rrrxyz.com" failed to be accessed using the first level privacy preferences, "rrrxyz.com" failed to be accessed using the second level privacy preferences, and no website was failed to be accessed using the third level privacy preferences. A plurality of "details" buttons 195 are provided for actuation by a user to provide further details regarding accessed and failed to be accessed websites including reasons for the failures, for example reasons indicating that particular PII requested by systems hosting webpages or websites or other services was not rendered accessible to such systems resulting in access failures. The "home" button 192 is provided to direct the user to a home screen enabled by the privacy negotiator 14.

A particular user is beneficially provided via the privacy negotiator 14 with a list of webpages, websites or other services with their respective corresponding negotiated privacy level as negotiated by the privacy negotiator 14 on the particular user's computing device 12, or alternatively as negotiated by the privacy negotiator 14 on computing devices 12 of other users and rendered accessible to the privacy negotiator 14 on the particular user's computing device 12 via the privacy manager 20. The list of webpages, websites or other services is beneficially color coded. For example listed names of websites or applications requiring high levels of PII and deemed to be privacy intruding can be colored red, listed names of websites or applications requiring medium levels of PII and deemed to institute neutral privacy standards can be colored yellow, and listed names of websites or applications requiring little or no PII and deemed to institute high privacy standards can be colored green. The user is beneficially enabled to select listed webpages, websites or other services for more detailed information about their negotiated privacy level or to choose further action, for example to block a listed service or set a privacy level or negotiate or renegotiate the privacy level for the listed service.

Referring to FIG. 2I, a ninth exemplary interactive display 196 shows to a particular user via the user interface 56 "web/app privacy levels" generated by the privacy negotiator 14. The privacy levels are reflective for example of the privacy preferences used by the privacy negotiator 14 to successfully access particular webpages or websites on the particular user's computing device 12 or preferences used by the privacy negotiators 14 on other computing devices 12 of other users to access the particular webpages or websites. The ninth exemplary interactive display 196 indicates that the "rrrxyz.com" has a low privacy level suggesting that it was accessed using third level privacy preferences, "abcxyz.com" and "mnoxyz.com" have a medium privacy level suggesting that they were accessed using second level privacy preferences, and "nnnxyz.com" has a high privacy level suggesting that it was accessed using first level privacy preferences. For accentuation, low privacy level webpages, websites, or other services can be listed in red, medium privacy level webpages, websites, or other services can be listed in yellow, and high privacy level webpages, websites, or other services can be listed in green. A user is enabled to attempt to raise or lower privacy levels of webpages, websites or other services by actuation of "set level" buttons 197 for example initiating a renegotiation by the privacy negotiator 14, with the understanding that increasing or decreasing the privacy level of a webpage, website or other service may be disallowed by the corresponding hosting server. "Block" buttons 198 are provided for actuation by a user to allow the privacy negotiator 14 to block access by the user to a listed webpage, website, or other service.

Referring to FIG. 3 a chart is provided showing a communication flow of a negotiation process 200 for accessing a network-accessible resource as performed by elements depicted in FIG. 1. Alternatively, the process 200 can be performed by other computing elements in a network. In the process 200 a user attempts to access a service including a network-accessible resource via a user interface 56 of a computing device 12 (communication 202), for example by inputting a universal resource locator (URL) into a web browser 50. The privacy negotiator 14 detects the attempt to access the resource and transmits a first access request to the web/app server 40 for the resource responsive to detecting the attempt, the first access request transmitted without personally identifiable information of the user and with media blocking (e.g., ad blocking) enabled (communication 204). The privacy negotiator 14 receives a failure indication, a response including the requested resource, or other notification from the web/app server 40 (communication 206) in response to the first access request of communication 204. If a failure indication or other notification indicates that the access request of communication 204 partially or completely failed, a second access request is transmitted (communication 208) by the privacy negotiator 14 to the web/app server 40, the second access request including artificial personally identifiable information ("PII") which does not identify or directly relate to the user. The artificial personally identifiable information is beneficially synthetic personally identifiable information for example synthesized based on demographic information or geographic location information of the user.

The privacy negotiator 14 receives a failure indication, a response including the requested resource, or other notification from the web/app server 40 (communication 210) in response to the second access request of communication 208. If a failure indication or other notification indicates that the access request of communication 208 partially or completely failed, a request for consent to access the resource with the user's personally identifiable information is made to the user via the user interface 56 by the privacy negotiator 14 (communication 212). The user can provide consent to the privacy negotiator 14 via the user interface 56 to access the resource with personally identifiable information ("PII") of the user (communication 214). In response to the user's consent, the privacy negotiator 14 requests access, by a third access request, to the resource with the PII of the user (communication 216) and beneficially with media blocking (e.g., ad blocking) disabled. A response including the requested resource or other notification from the web/app server 40 is received by the privacy negotiator 14 and rendered accessible to the user (communication 218).

An access request of communication 204, communication 208, or communication 216 which successfully results in access to a particular resource, as evidenced by the communication 206, communication 210, or communication 218, is beneficially stored along with privacy preferences used in the access request (e.g., media blocking enabled or disabled) and any artificial PII or PII of the user, for example stored in a persistent memory attached to the privacy negotiator 14. The next time the user attempts to access the service including the particular resource (communication 202), the stored successful access request of communication 204, communication 208, or communication 216 including privacy preferences thereof and any corresponding artificial PII or PII of the user is beneficially used first, for example skipping the first access request (communication 204) or skipping the first access request (communication 204) and the second access request (communication 208). In such manner access requests to a resource are minimized, conserving system processing and bandwidth requirements.

The network resource described in the process 200 can include for example a webpage accessible via a web browser 50 executed by the computing device 12. Referring to FIG. 4 a chart is provided describing the communication flow of a webpage negotiation process 200A, which is a particular implementation of the negotiation process 200 where the accessed network resource includes a webpage. In the process 200A a user attempts to access a service including a webpage (communication 202A) via a user interface 56 of a computing device 12, for example by inputting a universal resource locator (URL) into the web browser 50. The privacy negotiator 14 is beneficially enabled as a plugin, add-on, or extension of the web browser 50 and detects the attempt to access the webpage. In response to detecting the attempt to access the webpage, the privacy negotiator 14 transmits a first access request to the web/app server 40 without personally identifiable information, with a fresh cookie, without browser history of the user, and with media blocking (e.g., ad blocking) enabled (communication 204A). The privacy negotiator 14 receives a failure indication, a response including the webpage data, or a notification regarding a failure to load a webpage, or other notification from the web/app server 40 (communication 206A) in response to the first access request of communication 204A. If the webpage fails to load or a notification indicates that the access request of communication 204A partially or completely failed, a second access request is transmitted (communication 208A) and temporary cookies are stored by the privacy negotiator 14 via the web browser 50 in an attempt to reload the webpage, the second access request including artificial personally identifiable information and an artificial browser fingerprint. The artificial personally identifiable information and the artificial browser fingerprint are respectively beneficially synthetic personally identifiable information and a synthetic browser fingerprint, for example synthesized based on demographic information or geographic location information of the user.

The privacy negotiator 14 receives a failure indication, a response including webpage data for loading the webpage via the web browser 50, or other notification from the web/app server 40 (communication 210A) in response to the second access request of communication 208A. If the webpage fails to load for example evidenced by a failure indication received by the privacy negotiator 14, or if other notification indicates that the access request of communication 208A partially or completely failed, a request for consent to access the webpage with the user's personally identifiable information is made to the user via the user interface 56 by the privacy negotiator 14 via the web browser 50 (communication 212A). For example, the request for consent can be made via the action window 130 described with reference to FIGS. 2C and 2D. The user can provide consent to the privacy negotiator 14 via the user interface 56 to access the webpage with personally identifiable information ("PII") of the user (communication 214A). For example, consent can be provided by the user via the "allow use of genuine personal info" button 132 of the action window 130. In response to the user's consent, the privacy negotiator 14 via the web browser 50 requests access, by a third access request, to the webpage with the PII of the user (communication 216A) and beneficially with media blocking (e.g., ad blocking) disabled. The user's consent is stored in the local datastore 54 and the user datastore 26 so that the next time the user attempts to access the webpage, it can be accessed with the PII of the user without requesting consent from the user. A response including the webpage data or other notification from the web/app server 40 is received by the privacy negotiator 14 and rendered accessible to the user via the web browser 50 (communication 218A).

An access request of communication 204A, communication 208A, or communication 216A which successfully results in access to a particular webpage, as evidenced by the communication 206A, communication 210A, or communication 218A, is beneficially stored along with privacy preferences used in the access request (e.g., media blocking enabled or disabled) and any artificial PII or PII of the user, for example stored in a persistent memory attached to the privacy negotiator 14. The next time the user attempts to access the particular webpage (communication 202A), the stored successful access request of communication 204A, communication 208A, or communication 216A including privacy preferences thereof and any corresponding artificial PII or PII of the user is beneficially used first, for example skipping the first access request (communication 204A) or skipping the first access request (communication 204A) and the second access request (communication 208A). In such manner access requests to a resource are minimized, conserving system processing and bandwidth requirements.

Referring to FIG. 5 a chart is provided showing a communication flow of another negotiation process 300 for accessing a network-accessible resource as performed by elements depicted in FIG. 1. Alternatively, the process 300 can be performed by other computing elements in a network. In the process 300, a user via the user interface 56 provides first privacy preferences to the privacy negotiator 14, or the privacy negotiator 14 gathers or infers the first privacy preferences of the user based on device use history of the user via one or more computing devices 12 (communication 302). Queries shown in the first and second exemplary interactive displays 100, 110 can facilitate a user providing the first privacy preferences. The user attempts to access a service including a network-accessible resource via a user interface 56 of a computing device 12 (communication 304), for example by inputting a universal resource locator (URL) into a web browser 50. The privacy negotiator 14 detects the attempt to access the resource, and a first access request is transmitted by the privacy negotiator 14 to the web/app server 40 responsive to detecting the user's attempt to access the service including the resource (communication 306), the first access request based on the first privacy preferences of the user. A response from the web/app server 40 including a version of the requested resource conforming to the first privacy preferences or including a failure indication or other notification is received by the privacy negotiator 14 and rendered accessible to the user (communication 308).

If no conforming version of the resource is received or the conforming version of the resource is inadequate or unacceptable to the privacy negotiator 14 or the user, the privacy negotiator 14 requests consent of the user to access the resource of the service of the web/app server 40 with second privacy preferences (communication 310). The user can provide via the user interface 56 consent to the privacy negotiator 14 to access the resource with the second privacy preferences (communication 312). The user via the user interface 56 can further provide the second privacy preferences to the privacy negotiator 14 (communication 314, e.g., via first and second exemplary interactive displays 100, 110), or alternatively the privacy negotiator 14 gathers or infers the second privacy preferences of the user based on device use history of the user. The second privacy preferences are beneficially more liberal, affording less privacy to the user than the first privacy preferences, to increase the likelihood that an acceptable version of the resource will be provided by the web/app server 40. Alternatively, the second privacy preferences, and also the first privacy preferences, can be set by default by the privacy negotiator 14 without input by the user. Further, the first and second privacy preferences can be received at any time, for example during initial installation and setup of the privacy negotiator 14 on a computing device 12. In response to the user's consent, the privacy negotiator 14 requests from the web/app server 40 access to the resource based on the second privacy preferences (communication 316), beneficially with media blocking (e.g., ad blocking) disabled. A response including a version of the requested resource or including a failure indication or other notification from the web/app server 40 is received by the privacy negotiator 14 and rendered accessible to the user (communication 318).

An access request of communication 306 or communication 316 which successfully results in access to a particular resource, as evidenced by the communication 308 or communication 318, is beneficially stored along with privacy preferences used in the access request (e.g., media blocking enabled or disabled), for example stored in a persistent memory attached to the privacy negotiator 14. The next time the user attempts to access the service including the particular resource (communication 304), the stored successful access request of communication 306 or communication 316 including privacy preferences thereof is beneficially used first, for example skipping the first access request (communication 306). In such manner access requests to a resource are minimized, conserving system processing and bandwidth requirements.

Figure 6:
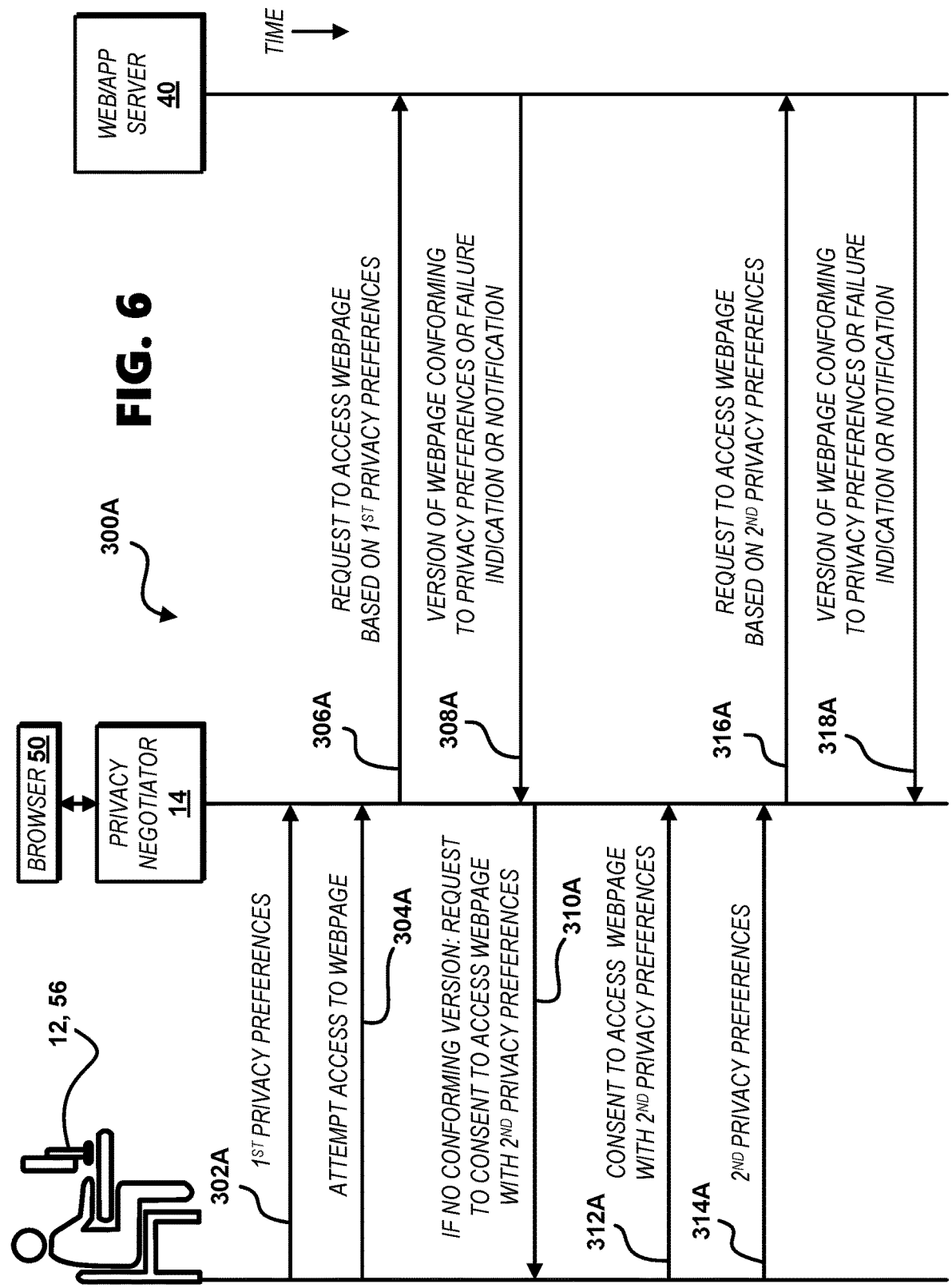

The network resource described in the process 300 can include for example a webpage accessible via a web browser 50. Referring to FIG. 6 a chart is provided describing the communication flow of a webpage negotiation process 300A, which is a particular implementation of the negotiation process 300 where the accessed network resource includes a webpage. In the process 300, a user via the user interface 56 provides first privacy preferences to the privacy negotiator 14, or the privacy negotiator 14 gathers or infers the first privacy preferences of the user based on the device use history of the user, for example user web browsing history via web browsers 50 (communication 302A). The user attempts to access a webpage through a web browser 50 via a user interface 56 of a computing device 12 (communication 304A), for example by inputting a universal resource locator (URL) into the web browser 50. The privacy negotiator 14 detects the attempt to access the webpage, and a first access request is transmitted by the privacy negotiator 14 to the web/app server 40 responsive to the user's attempt to access the webpage (communication 306A), the first access request based on the first privacy preferences of the user. In an alternative implementation, referring further to FIG. 1, user privacy preferences of the user can be communicated to web/app servers 40 by a user preferences interface 34 of the privacy manager 20, either directly or via application settings APIs 44 of the web/app servers 40. A response from the web/app server 40 including a version of the webpage conforming to the first privacy preferences or including a failure indication or other notification is received by the privacy negotiator 14 and rendered accessible to the user (communication 308A). If no conforming version of the webpage is received or the conforming version of the webpage is inadequate or unacceptable to the privacy negotiator 14 or the user, the privacy negotiator 14 requests consent of the user to access the webpage hosted by the web/app server 40 with second privacy preferences (communication 310A). For example, the request for consent can be made via the action window 170 described with reference to FIGS. 2E and 2F. The user can provide consent to the privacy negotiator 14 via the user interface 56 using the web browser 50 to access the webpage with the second privacy preferences (communication 312A). For example, consent can be provided by the user via the "allow use of alternate personal info" button 172 of the action window 170. The user via the user interface 56 can further provide the second privacy preferences to the privacy negotiator 14 (communication 314A, e.g., via first and second exemplary interactive displays 100, 110), or alternatively the privacy negotiator 14 gathers or infers the second privacy preferences of the user based on device use history of the user. The second privacy preferences are beneficially more liberal, affording less privacy to the user than the first privacy preferences, to increase the likelihood that an acceptable version of the webpage will be provided by the web/app server 40. Alternatively, the second privacy preferences, and also the first privacy preferences, can be set by default by the privacy negotiator 14 without input by the user. Further, the first and second privacy preferences can be received at any time, for example during initial installation and setup of the privacy negotiator 14 on a computing device 12. In response to the user's consent, the privacy negotiator 14 requests from the web/app server 40 access to the webpage based on the second privacy preferences via the web browser 50 (communication 316A), beneficially with media blocking (e.g., ad blocking) disabled through the web browser 50. A response including a version of the webpage or failure indication or other notification from the web/app server 40 is received by the privacy negotiator 14 and rendered accessible to the user via the web browser 50 (communication 318A).

An access request of communication 306A or communication 316A which successfully results in access to a particular webpage, as evidenced by the communication 308A or communication 318A, is beneficially stored along with privacy preferences used in the access request (e.g., media blocking enabled or disabled), for example stored in a persistent memory attached to the privacy negotiator 14. The next time the user attempts to access the webpage (communication 304A), the stored successful access request of communication 306A or communication 316A including privacy preferences thereof is beneficially used first, for example skipping the first access request (communication 306A). In such manner access requests to a resource are minimized, conserving system processing and bandwidth requirements.

Figure 7:
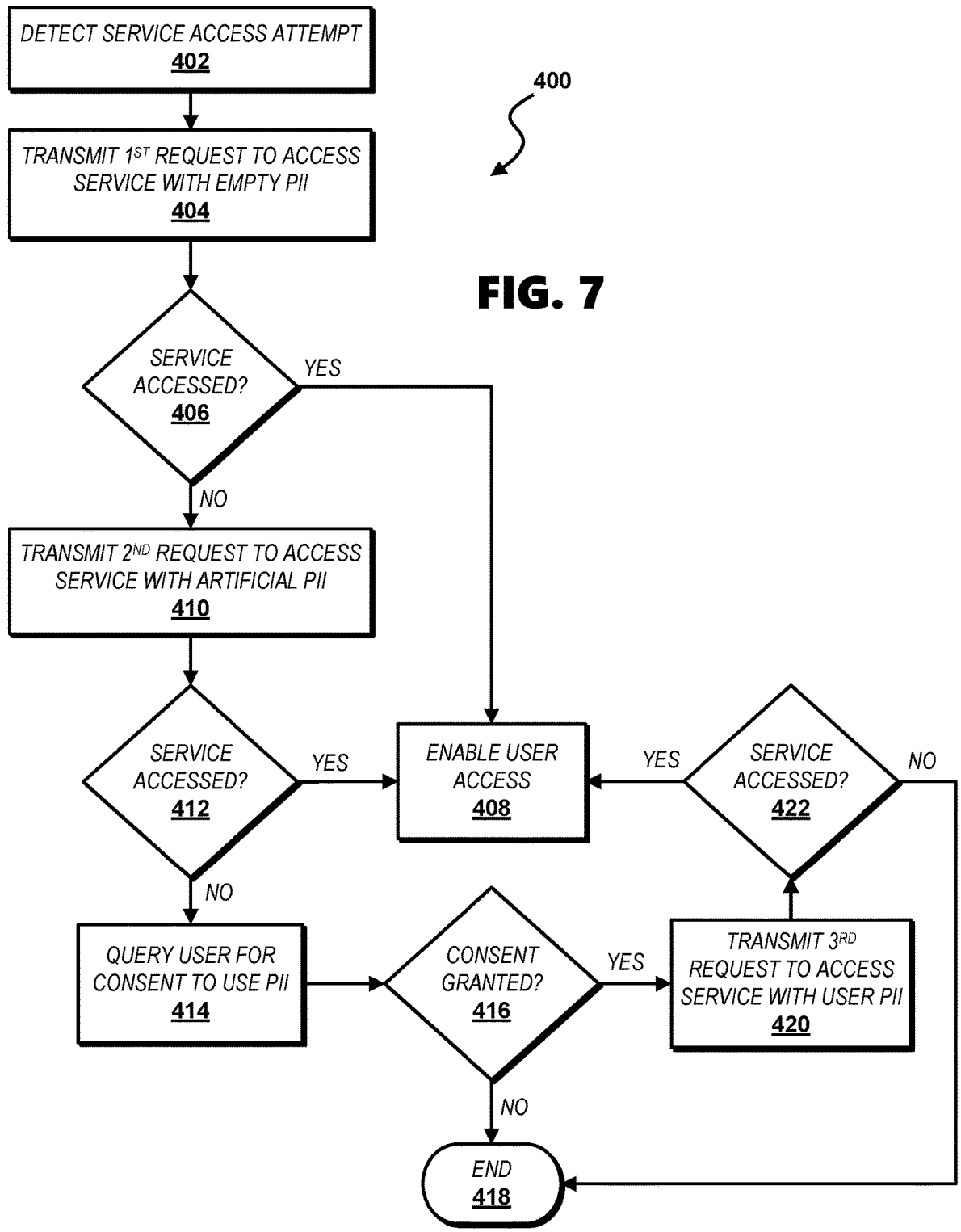
FIGS. 7 and 8 are diagrams showing methods for performing privacy negotiations and enabling user access to network resources.

Referring to FIG. 7, a network resource access control process 400 is shown. The process 400 is described with reference to the components of the system 10 shown in FIG. 1, including for example the computing device 12, the processor-enabled privacy manager 20, the privacy negotiator 14, and the network 8. Alternatively, the process 400 can be performed via other suitable systems and is not restricted to being implemented by the components of the system 10.

In a step 402, an attempt by a user via a computing device to access a service enabled by a computing system via a network is detected. For example, the computing system can include the web/app server 40, the computing device can include the computing device 12, the network can include the network 8, and the process 400 can be performed by the privacy negotiator 14. The service can include a website or a webpage thereof, and detecting the attempt by the user to access the service can include for example receiving a request from the user to access via the network a webpage hosted on the computing system using a web browser, for example a web browser 50 executed by the computing device 12.

A first request to access the service is transmitted via the network to the computing system in response to detecting the attempt by the user to access the service (step 404), the first request including one or more empty personally identifiable data structures. Transmitting the first request including the one or more empty personally identifiable data structures can include for example requesting access to a webpage from the computing system using a fresh cookie file including an empty browsing history or using a fresh profile, the fresh cookie file and the fresh profile being empty personally identifiable data structures. The first request can also include an instruction to not accept cookie files from the service as enabled by the computing system. The first request can further include an instruction to block at least one media type of the service from being received from the computing system, for example to block advertisements by incorporating an ad blocker protocol into the request.

If the service is determined to be accessed responsive to the first request (step 406), user access to the service is enabled (step 408), for example via a web browser. If a first failure to access the service responsive to the first request is determined (step 406), a second request to access the service is transmitted via the network to the computing system in response to the first failure to access the service, the second request including artificial personally identifiable information (step 410). The first failure to access the service can include a partial failure to access the service, such as a partial failure to access features of a website hosted on the computing system, for example receiving access to a version of a requested webpage in which features are restricted or blocked as opposed to receiving access to an unrestricted webpage version. A query can be received from the computing system responsive to the first request, for example in the form of the pop-up notice 122, the query asking for change to browser privacy settings of the computing device, in which case the first failure to access the service is determined at least based on and responsive to the received query. The received query can for example ask the user to accept a cookie file.

Beneficially, genuine personally identifiable information of the user is received, for example from the user based on a user survey or gathered from a user's device use history or otherwise inferred based on a the user's device use history, and the artificial personally identifiable information is synthetic personally identifiable information generated based on the genuine personally identifiable information of the user. For example if the genuine personally identifiable information includes a particular geographic location of the user, the artificial personally identifiable can be determined to include a different geographic location including similar qualities to the particular geographic location, such as demographic qualities, climate, and population density. The artificial personally identifiable information can also be generated or inferred based on the user's device use history.

If the service is determined to be accessed responsive to the second request (step 412), user access to the service is enabled (step 408). If a second failure to access the service responsive to the second request is determined (step 412), the user is queried via the computing device for consent to access the service using personally identifiable information of the user (step 414). If it is determined that consent to access the service using the personally identifiable information of the user is not granted by the user (step 416), the process ends (step 418), and no further attempt is made to access the service. If it is determined that consent to access the service using the personally identifiable information of the user is granted by the user (step 416), a third request to access the service in response to receiving from the user the consent is transmitted via the network to the computing system (step 420), the third request including the personally identifiable information of the user. If a third failure to access the service responsive to the third request is determined (step 422), the process ends (step 418), and no further attempt is made to access the service. If the service is determined to be accessed (step 422), user access to the service is enabled (step 408).

As indicated above, the attempt by the user to access the service can include an attempt by the user to access a webpage hosted by the computing system, for example the web/app server 40. The attempt by the user to access the webpage can be detected (step 402) by a browser plugin executed by a processor of the computing device within a browser, for example in the form of the privacy negotiator 14 in connection with a web browser 50 executed by a processor of the computing device 12. Further the first request can be transmitted (step 404), the second request can be transmitted (step 410), and the third request can be transmitted (step 420) via the browser plugin during operation of a browser.

A transmitted first, second, or third request to access a particular service (step 404, step 410, or step 420) which successfully results in access to the particular service is beneficially stored along with privacy preferences (e.g., media blocking enabled or disabled) of the successful access request and any artificial PII or PII of the user used in the successful access request, for example stored in a persistent memory attached to the privacy negotiator 14. The next time the user is detected as attempting to access the particular service (step 402), the stored successful access request of step 404, step 410, or step 420, including privacy preferences thereof and any corresponding artificial PII or PII of the user, is beneficially used first, for example skipping transmission of the first access request (step 404) and instead first transmitting the second access request (step 410), or skipping transmission of the first access request (step 404) and the second access request (step 410) and instead first transmitting the third access request (step 420). In such manner access requests to a resource are minimized, conserving system processing and bandwidth requirements.

Figure 8:
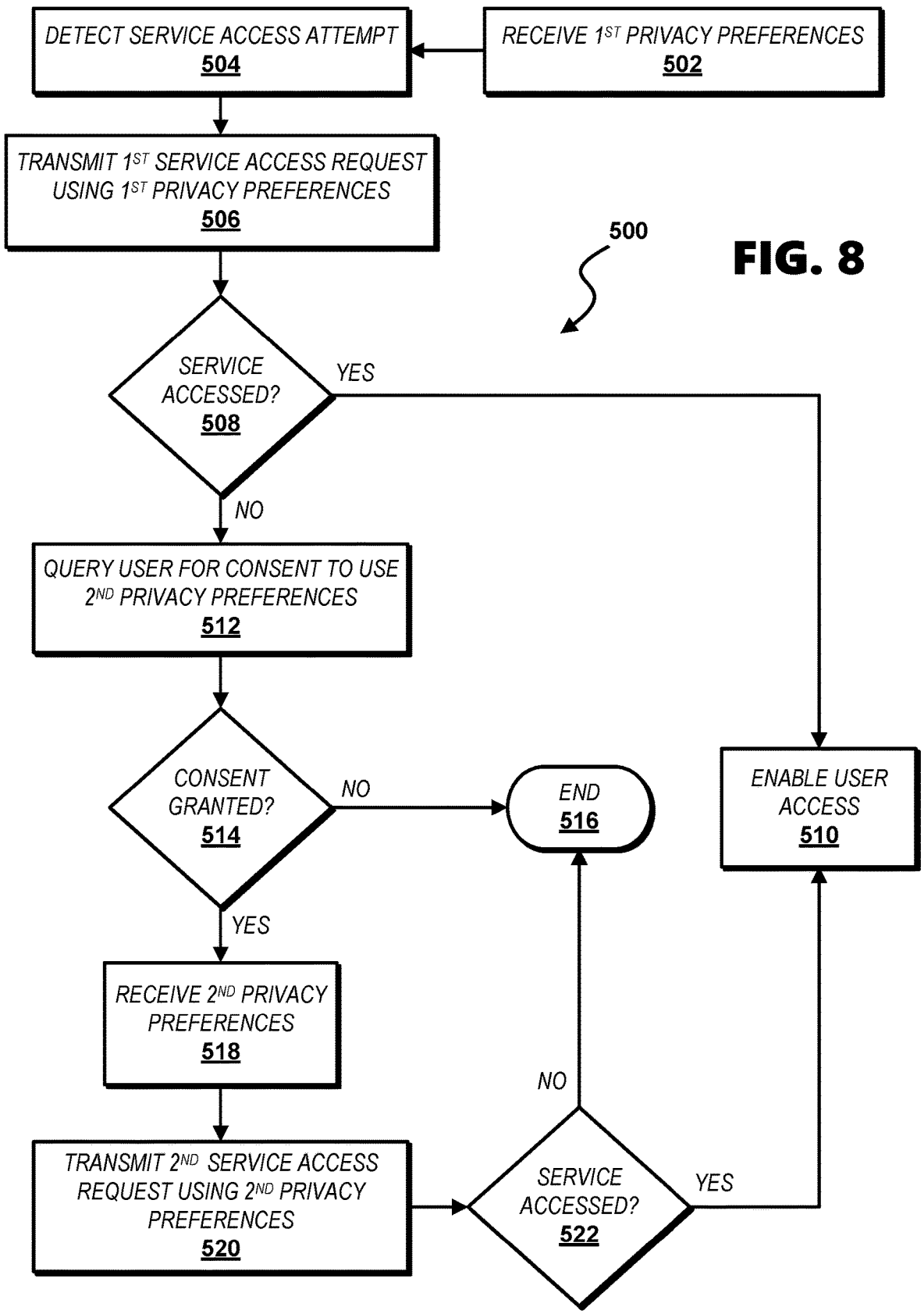

Referring to FIG. 8, a network resource access control process 500 is shown. The process 500 is described with reference to the components of the system 10 shown in FIG. 1, including for example the computing device 12, the processor-enabled privacy manager 20, the privacy negotiator 14, and the network 8.

Alternatively, the process 500 can be performed via other suitable systems and is not restricted to being implemented by the components of the system 10.

In a step 502, first privacy preference parameters are received from a user. Beneficially, the first privacy preference parameters of the user, and also second privacy preference parameters described herein, are received from the user based on a user survey such as shown in first and second exemplary interactive displays 100, 110, or gathered from a user's device use history, or otherwise inferred based on a the user's device use history.

An attempt by a user via a computing device to access a service enabled by a computing system via a network is detected (step 504). The service can include a website or a webpage thereof, and detecting the attempt by the user to access the service can include for example receiving a request from the user to access via the network a webpage hosted on the computing system using a web browser, for example a web browser 50 executed by the computing device 12. For example, referring to FIG. 1, the computing system can include a web/app server 40, the computing device can include the computing device 12, the network can include the network 8, and the process 500 can be performed by the privacy negotiator 14. A first request to access the service is transmitted via the network to the computing system using the first privacy preference parameters of the user in response to detecting the attempt by the user to access the service (step 506). If the service is determined to be accessed (step 508), user access to the service is enabled (step 510), for example a via a web browser 50 which loads a webpage. If a first failure to access the service responsive to the first request is determined (step 508), the user is queried for consent to access the service using second privacy preference parameters (step 512). If it is determined that consent to access the service using the second privacy preference parameters of the user is not granted by the user (step 514), the process ends (step 516), and no further attempt is made to access the service. If it is determined that consent to access the service using the second privacy preference parameters of the user is granted by the user (step 514), the second privacy preference parameters of the user are received (step 518), and a second request to access the service is transmitted via the network to the computing system using the second privacy preference parameters of the user in response to receiving from the user the consent to access the service (step 520). The second privacy preference parameters can alternatively be received at the same time and in the same manner as the first privacy preference parameters are received or other earlier time and need not be received in response to receiving from the user the consent to access the service. If, responsive to the second request, a second failure to access the service is determined (step 522), the process ends (step 516), and no further attempt is made to access the service. If the service is determined to be accessed (step 522), user access to the service is enabled (step 510).

The transmitting of the first request (step 506) and the transmitting of the second request (step 520) can include transmitting requests to access a webpage hosted by the computing system, the computing system for example including a web/app server 40. Receiving access to the service (steps 508, 522) can include receiving from the computing system via the network Hypertext Markup Language ("HTML") code of the webpage. The receiving of the first privacy preference parameters (step 506) and the receiving of the second privacy preference parameters (step 518) can include receiving privacy preference parameters of the user from the user, for example by querying the user for the privacy preference parameters. Alternatively, the receiving of the first privacy preference parameters (step 506) and the receiving of the second privacy preference parameters (step 518) can include inferring one or both of the first privacy preference parameters or the second privacy preference parameters based on a usage history of the user on the computing device or other systems.

A transmitted first or second request to access a particular service (step 506 or step 520) which successfully results in access to the particular service is beneficially stored along with privacy preferences (e.g., media blocking enabled or disabled) of the successful access request, for example stored in a persistent memory attached to the privacy negotiator 14. The next time the user is detected as attempting to access the particular service (step 504), the stored successful access request of step 506 or step 520, including privacy preferences of the successful access request, is beneficially used first, for example skipping transmission of the first access request (step 506) and instead first transmitting the second access request (step 520). In such manner access requests to a resource are minimized, conserving system processing and bandwidth requirements.

The processes and methods described herein, for example as performed by components of the system 10, enable protocols providing negotiation capabilities to allow flexibility in accepting privacy policies of hosted services such as webpages. The enabled protocols can automatically configure tiered privacy policies. For example some websites may allow different levels of functionality depending on the amount of data received from a user, more data corresponding to more functionality. The enabled protocols allow users to negotiate data for desired functionality of a hosted service. Further, the enabled protocols allow users to choose artificial data (e.g., synthetic data) to share with systems hosting services, for example webpages and websites.

Figure 9:
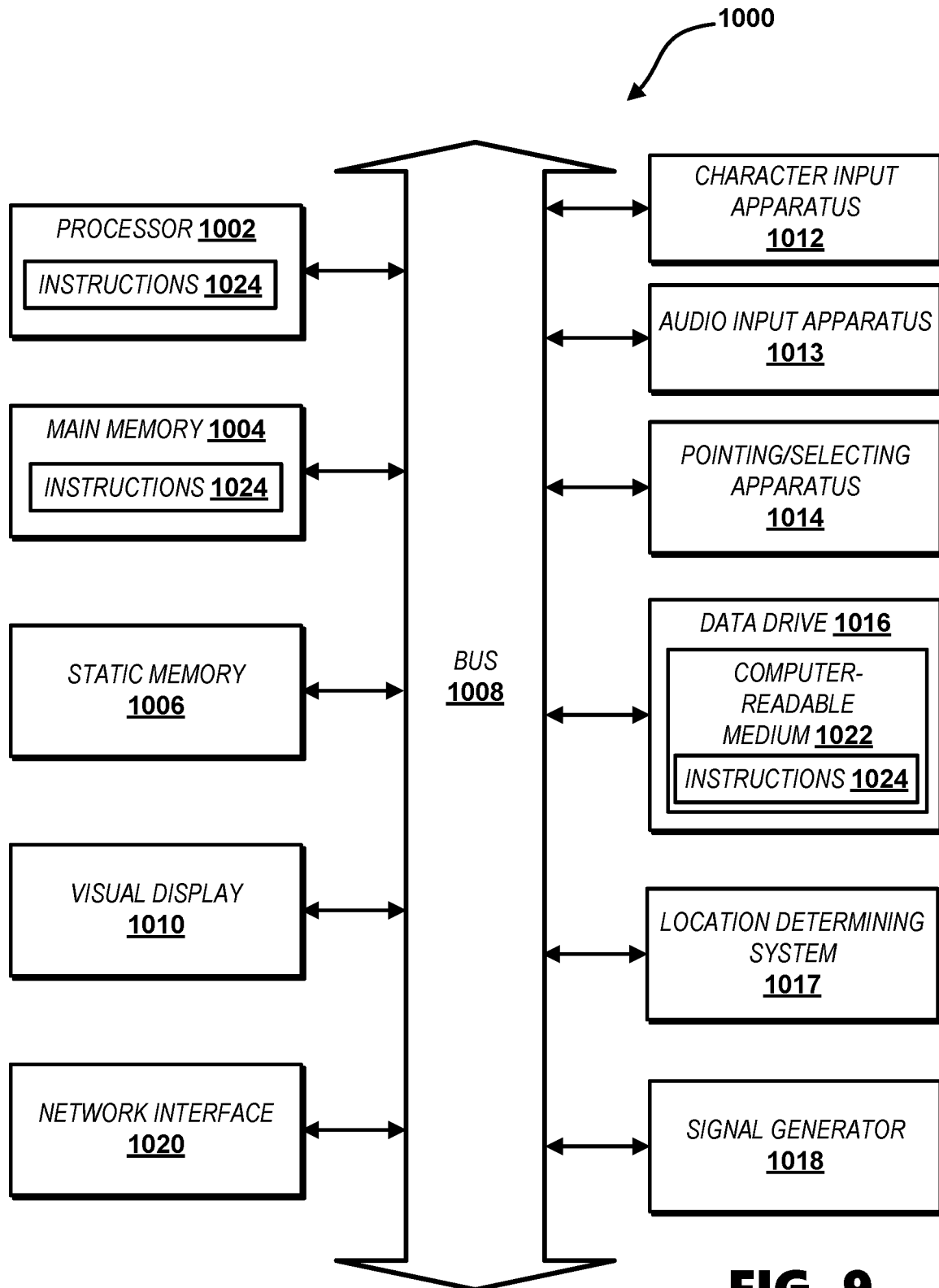
FIG. 9 is an illustrative computer system for performing described methods according to the illustrative embodiments.

FIG. 9 illustrates in abstract the function of an exemplary computer system 1000 on which the systems, methods and processes described herein can execute. For example, the computing device 12, privacy manager 20, web/app server 40, and application settings API 44 can each be embodied by a particular computer system 1000. The computer system 1000 may be provided in the form of a personal computer, laptop, handheld mobile communication device, mainframe, distributed computing system, or other suitable configuration. Illustrative subject matter is in some instances described herein as computer-executable instructions, for example in the form of program modules, which program modules can include programs, routines, objects, data structures, components, or architecture configured to perform particular tasks or implement particular abstract data types. The computer-executable instructions are represented for example by instructions 1024 executable by the computer system 1000.

The computer system 1000 can operate as a standalone device or can be connected (e.g., networked) to other machines. In a networked deployment, the computer system 1000 may operate in the capacity of a server or a client machine in server-client network environment, or as a peer machine in a peer-to-peer (or distributed) network environment. The computer system 1000 can also be considered to include a collection of machines that individually or jointly execute a set (or multiple sets) of instructions to perform one or more of the methodologies described herein.

It would be understood by those skilled in the art that other computer systems including but not limited to networkable personal computers, minicomputers, mainframe computers, handheld mobile communication devices, multiprocessor systems, microprocessor-based or programmable electronics, and smart phones could be used to enable the systems, methods and processes described herein. Such computer systems can moreover be configured as distributed computer environments where program modules are enabled and tasks are performed by processing devices linked through a communications network, and in which program modules can be located in both local and remote memory storage devices.

The exemplary computer system 1000 includes a processor 1002, for example a central processing unit (CPU) or a graphics processing unit (GPU), a main memory 1004, and a static memory 1006 in communication via a bus 1008. A visual display 1010 for example a liquid crystal display (LCD), light emitting diode (LED) display or a cathode ray tube (CRT) is provided for displaying data to a user of the computer system 1000. The visual display 1010 can be enabled to receive data input from a user for example via a resistive or capacitive touch screen. A character input apparatus 1012 can be provided for example in the form of a physical keyboard, or alternatively, a program module which enables a user-interactive simulated keyboard on the visual display 1010 and actuatable for example using a resistive or capacitive touchscreen. An audio input apparatus 1013, for example a microphone, enables audible language input which can be converted to textual input by the processor 1002 via the instructions 1024. A pointing/selecting apparatus 1014 can be provided, for example in the form of a computer mouse or enabled via a resistive or capacitive touch screen in the visual display 1010. A data drive 1016, a signal generator 1018 such as an audio speaker, and a network interface 1020 can also be provided. A location determining system 1017 is also provided which can include for example a GPS receiver and supporting hardware.

The instructions 1024 and data structures embodying or used by the herein-described systems, methods, and processes, for example software instructions, are stored on a computer-readable medium 1022 and are accessible via the data drive 1016. Further, the instructions 1024 can completely or partially reside for a particular time period in the main memory 1004 or within the processor 1002 when the instructions 1024 are executed. The main memory 1004 and the processor 1002 are also as such considered computer-readable media.

While the computer-readable medium 1022 is shown as a single medium, the computer-readable medium 1022 can be considered to include a single medium or multiple media, for example in a centralized or distributed database, or associated caches and servers, that store the instructions 1024. The computer-readable medium 1022 can be considered to include any tangible medium that can store, encode, or carry instructions for execution by a machine and that cause the machine to perform any one or more of the methodologies described herein, or that can store, encode, or carry data structures used by or associated with such instructions. Further, the term "computer-readable storage medium" can be considered to include, but is not limited to, solid-state memories and optical and magnetic media that can store information in a non-transitory manner. Computer-readable media can for example include non-volatile memory such as semiconductor memory devices (e.g., magnetic disks such as internal hard disks and removable disks, magneto-optical disks, CD-ROM and DVD-ROM disks, Erasable Programmable Read-Only Memory (EPROM), Electrically Erasable Programmable Read-Only Memory (EEPROM), and flash memory devices).

The instructions 1024 can be transmitted or received over a communications network, for example the communications network 8, using a signal transmission medium via the network interface 1020 operating under one or more known transfer protocols, for example FTP, HTTP, or HTTPs. Examples of communication networks include a local area network (LAN), a wide area network (WAN), the Internet, mobile telephone networks, Plain Old Telephone (POTS) networks, and wireless data networks, for example Wi-Fi™ and 3G/4G/5G cellular networks. The term "computer-readable signal medium" can be considered to include any transitory intangible medium that is capable of storing, encoding, or carrying instructions for execution by a machine, and includes digital or analog communications signals or other intangible medium to facilitate communication of such instructions.

Although features and elements are described above in particular combinations, one of ordinary skill in the art will appreciate that each feature or element can be used alone or in any combination with the other features and elements. Methods described herein may be implemented in a computer program, software, or firmware incorporated in a computer-readable medium for execution by a computer or processor. While embodiments have been described in detail above, these embodiments are non-limiting and should be considered as merely exemplary. Modifications and extensions may be developed, and all such modifications are deemed to be within the scope defined by the appended claims.

What is claimed is:

1. A method comprising:
   receiving genuine personally identifiable information of a user;
   generating artificial personally identifiable information based on the genuine personally identifiable information of the user;
   detecting an attempt by the user via a computing device to access a service enabled by a computing system via a network;
   transmitting via the network to the computing system a first request to access the service in response to detecting the attempt by the user to access the service, the first request comprising at least one empty personally identifiable data structure;
   determining a first failure to access the service responsive to the first request;
   transmitting via the network to the computing system a second request to access the service in response to the first failure to access the service, the second request comprising the artificial personally identifiable information; and
   receiving access to the service from the computing system for the user.

2. The method of claim 1, further comprising:
   determining a second failure to access the service responsive to the second request comprising the artificial personally identifiable information;
   querying the user via the computing device for consent to access the service using the genuine personally identifiable information of the user in response to determining the second failure to access the service;
   receiving from the user via the computing device the consent to access the service using the genuine personally identifiable information of the user;
   transmitting via the network to the computing system a third request to access the service in response to receiving from the user the consent to access the service using the genuine personally identifiable information of the user, the third request comprising the genuine personally identifiable information of the user; and
   receiving access to the service from the computing system for the user after transmitting the third request via the network to the computing system.

3. The method of claim 1, wherein determining the first failure to access the service comprises determining a partial failure to access the service.

4. The method of claim 1, further comprising transmitting via the network the first request further comprising an instruction to block at least one media type of the service from being received from the computing system.

5. The method of claim 1, further comprising:
   receiving from the computing system a query asking for a change to browser privacy settings of the computing device; and
   determining the first failure to access the service responsive to the first request at least based on the query from the computing system asking for the change to the browser privacy settings of the computing device.

6. The method of claim 5, wherein detecting the attempt by the user to access the service comprises receiving a request from the user to access via the network a webpage hosted on the computing system.

7. The method of claim 5, wherein determining the first failure to access the service comprises determining a partial failure to access features of a website hosted on the computing system.

8. The method of claim 5, further comprising transmitting via the network the first request further comprising an instruction to not accept cookie files from the service.

9. The method of claim 1, further comprising:
   receiving from the computing system a query asking to accept a cookie file; and
   determining the first failure to access the service responsive to the first request at least based on the query asking to accept the cookie file.

10. The method of claim 1, wherein the
    attempt by the user via the computing device to access the service comprises an attempt by the user to access a webpage hosted by the computing system;
    the method further comprising:

detecting the attempt by the user to access the webpage by a browser plugin executed by a processor of the computing device; and transmitting the first request and transmitting the second request via the browser plugin.

11. The method of claim 10, wherein transmitting the first request comprising the at least one empty personally identifiable data structure comprises requesting access to the webpage using a fresh cookie file comprising an empty browsing history.

12. The method of claim 10, wherein transmitting the first request comprising the at least one empty personally identifiable data structure comprises requesting access to the webpage using a fresh profile.

13. An electronic system comprising a computing device comprising at least one hardware processor and at least one non-transitory computer-readable storage medium coupled to the at least one hardware processor and storing programming instructions for execution by the at least one hardware processor, wherein the programming instructions, when executed, cause the computing device to perform operations comprising:

- receiving genuine personally identifiable information of a user;
- generating artificial personally identifiable information based on the genuine personally identifiable information of the user;
- detecting an attempt by the user via the computing device to access a service enabled by a computing system via a network;
- transmitting via the network to the computing system a first request to access the service in response to detecting the attempt by the user to access the service, the first request comprising at least one empty personally identifiable data structure;
- determining a first failure to access the service, the first failure to access the service responsive to the first request;
- transmitting via the network to the computing system a second request to access the service in response to the first failure to access the service, the second request comprising the artificial personally identifiable information;
- determining a second failure to access the service via the second request comprising the artificial personally identifiable information;
- querying the user via the computing device for consent to access the service using the genuine personally identifiable information of the user;
- receiving from the user via the computing device the consent to access the service using the genuine personally identifiable information of the user;
- transmitting via the network to the computing system a third request to access the service in response to receiving from the user the consent to access the service using the genuine personally identifiable information of the user, the third request comprising the genuine personally identifiable information of the user; and
- receiving access to the service for the user after transmitting the third request via the network to the computing system.

* * * * *